(12) United States Patent
Simon

(10) Patent No.: US 12,067,356 B2
(45) Date of Patent: Aug. 20, 2024

(54) USER INTERFACE CATEGORIZATION BASED ON FILE NAME

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 17/830,562

(22) Filed: Jun. 2, 2022

(65) Prior Publication Data
US 2023/0394229 A1 Dec. 7, 2023

(51) Int. Cl.
G06F 40/174 (2020.01)
G06F 3/04886 (2022.01)
G06F 16/16 (2019.01)

(52) U.S. Cl.
CPC ........ *G06F 40/174* (2020.01); *G06F 3/04886* (2013.01); *G06F 16/164* (2019.01)

(58) Field of Classification Search
CPC .. G06F 16/164; G06F 40/174; G06F 3/04886; G06F 16/174
See application file for complete search history.

(56) References Cited

U.S. PATENT DOCUMENTS

| | | | |
|---|---|---|---|
| 10,311,076 B1* | 6/2019 | Bruhn | G16H 10/60 |
| 2006/0174054 A1* | 8/2006 | Matsuki | H04N 1/32625 |
| | | | 711/100 |
| 2006/0287974 A1* | 12/2006 | Mochizuki | G06F 16/10 |
| 2008/0222203 A1* | 9/2008 | Chu | H04N 5/772 |
| | | | 707/E17.02 |
| 2015/0261775 A1* | 9/2015 | Shin | H04L 67/1097 |
| | | | 707/827 |
| 2019/0065843 A1* | 2/2019 | Matsumoto | G06V 30/1456 |
| 2020/0285324 A1* | 9/2020 | Akimoto | G06F 40/30 |
| 2022/0336065 A1* | 10/2022 | Kondo | G16H 10/60 |

* cited by examiner

*Primary Examiner* — Tan H Tran
(74) *Attorney, Agent, or Firm* — Buckley, Maschoff & Talwalkar LLC

(57) ABSTRACT

Provided is a software process that can dynamically identify and display a plurality of category values of an electronic file based on a file name assigned to the electronic file. Thus, the software can automatically populate a user interface with details about content within the electronic file based on the file name. In one example, the method may include receiving an electronic computer file having a file name, identifying a subset of characters within the file name which correspond to a data category, mapping a value of the identified subset of characters to a category value in the data category, displaying an identifier of the electronic file on a user interface, and dynamically populating a predefined field within the user interface corresponding to the data category with the mapped category value.

20 Claims, 13 Drawing Sheets

Attachment List

150
- Filename: 01000034.pdf — 151
- Uploaded by: User 5 — Uploaded on: 4/19/2021 — 152
- Area: Not Verified (153) — Customer: Not Verified (154) — Type: Not Verified (155)

160
- Filename: AH5R445.jpg
- Uploaded by: User 7 — Uploaded on: 04/20/2021
- Area: Not Verified — Customer: Not Verified — Type: Not Verified

170
- Filename: TTY80344.doc
- Uploaded by: User 7 — Uploaded on: 04/29/2021
- Area: Not Verified — Customer: Not Verified — Type: Not Verified

180
- Filename: 1149234.pdf
- Uploaded by: User 32 — Uploaded on: 05/01/2021
- Area: Not Verified — Customer: Not Verified — Type: Invoice (185)
  - N/A
  - Invoice (186)
  - Receipt
  - Order

. . .
. . .
. . .

300A  FIG. 3A  302 — ( Mapping Pattern )

| Attachment List |
|---|

Filename: 0301.0001.pdf — 310

Uploaded by: James Doe    Uploaded on: 5/07/2021

Area: *Not Verified*    Customer: *Not Verified*    Type: *Not Verified*
　　　311a　　　　　　　　　　312a　　　　　　　　　313a

314 ✏️  (X) 315  316

Filename: 0101.0002.jpg — 320

Uploaded by: James Doe    Uploaded on: 5/07/2021

Area: *Not Verified*    Customer: *Not Verified*    Type: *Not Verified*
　　　321a　　　　　　　　　　322a　　　　　　　　　323a

Filename: 0303.0001.doc — 330

Uploaded by: James Doe    Uploaded on: 5/07/2021

Area: *Not Verified*    Customer: *Not Verified*    Type: *Not Verified*
　　　331a　　　　　　　　　　332a　　　　　　　　　333a

Filename: 0204.0001.jpg — 340

Uploaded by: James Doe    Uploaded on: 5/07/2021

Area: *Not Verified*    Customer: *Not Verified*    Type: *Not Verified*
　　　341a　　　　　　　　　　342a　　　　　　　　　343a

Filename: 0304.0002.doc — 350

Uploaded by: James Doe    Uploaded on: 5/07/2021

Area: *Not Verified*    Customer: *Not Verified*    Type: *Not Verified*
　　　351a　　　　　　　　　　352a　　　　　　　　　353a

304 — ( Run Categorizer )    306 — ⚙

302 — Mapping Pattern

Attachment List

Filename: 0301.0001.pdf — 310

Uploaded by: James Doe   Uploaded on: 5/07/2021

Area: Check-In   Customer: Grocery A   Type: Invoice
311b   312b   313b 314  315

---

Filename: 0101.0002.jpg — 320

Uploaded by: James Doe   Uploaded on: 5/07/2021

Area: Check-Out   Customer: Grocery A   Type: Receipt
321b   322b   323b

---

Filename: 0303.0001.doc — 330

Uploaded by: James Doe   Uploaded on: 5/07/2021

Area: Check-In   Customer: Grocery C   Type: Order
331b   332b   333b

---

Filename: 0204.0002.jpg — 340

Uploaded by: James Doe   Uploaded on: 5/07/2021

Area: Cust. Files   Customer: Restaurant A   Type: Receipt
341b   342b   343b

---

Filename: 0304.0003.doc — 350

Uploaded by: James Doe   Uploaded on: 5/07/2021

Area: Check-In   Customer: Restaurant A   Type: Invoice
351b   352b   353b

---

. . .
. . .

304 — Run Categorizer   306

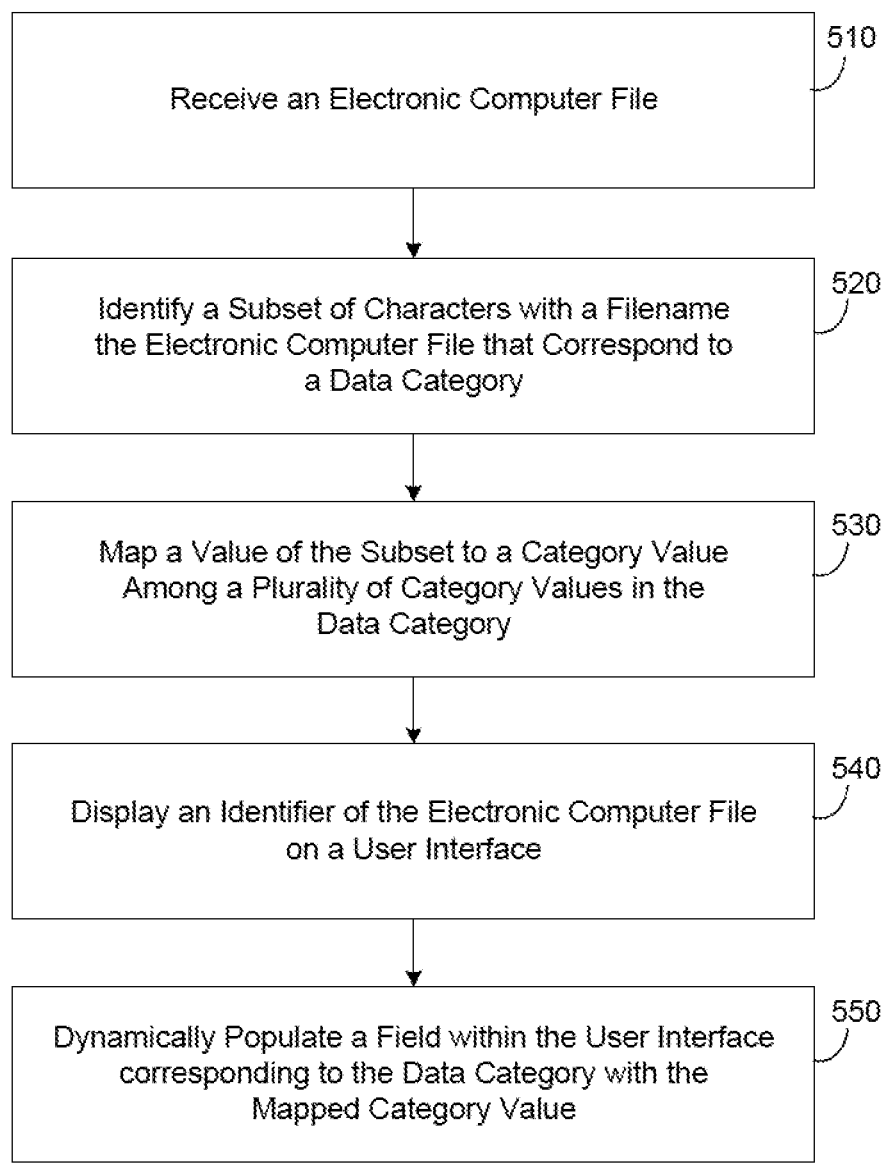

600     FIG. 6
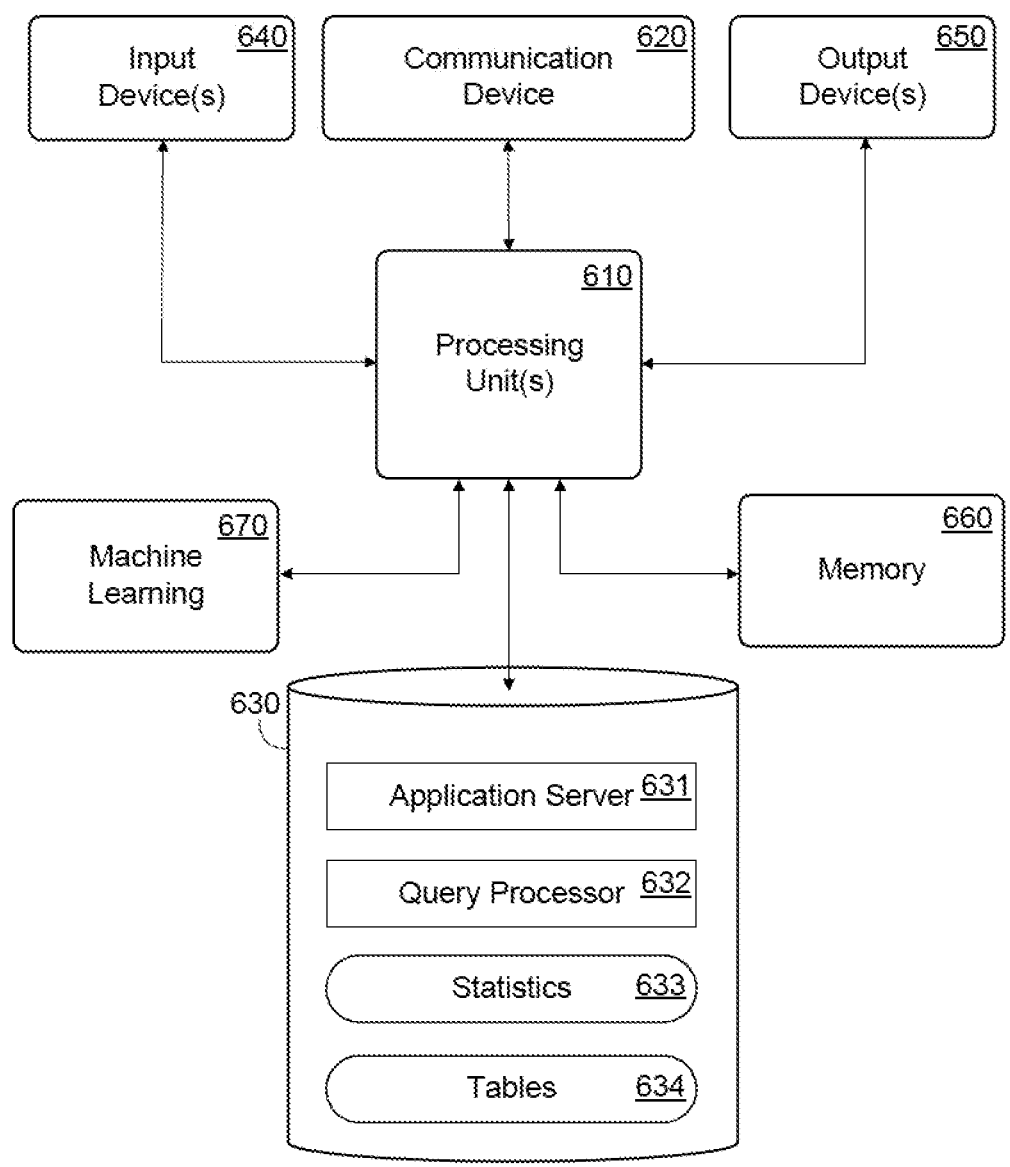

USER INTERFACE CATEGORIZATION BASED ON FILE NAME

BACKGROUND

A software application may have methods and processes that require an understanding of the underlying data being processed. For example, a software application may need to categorize data to correctly process the data. As one simple example, a field in a user interface may be dedicated to displaying a predefined data value pulled from a file (e.g., a database table, an electronic document, an electronic reports, a digital spreadsheet, an image file, a .pdf file, etc.). In this case, the software application may output a user interface to enable a user to identify/verify the data and also enter the correct value into the field on the user interface. The data entry is especially time consuming when the user must enter values for many different files (e.g., hundreds or even thousands, etc.). As a result, the user can spend hours over multiple days accessing the user interface and inputting the details software application. In addition to consuming a significant amount of time, the process is subject to human error.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIGS. 3A-3C are diagrams illustrating a process of categorizing files and displaying category values via a user interface based on file names of the files, in accordance with example embodiments.

FIG. 5 is a diagram illustrating a method of mapping an identifier within a file name to a category value and displaying the category value via a user interface in accordance with an example embodiment.

FIG. 6 is a diagram illustrating a computing system for use in any of the embodiments that are described herein.

Figure 1:
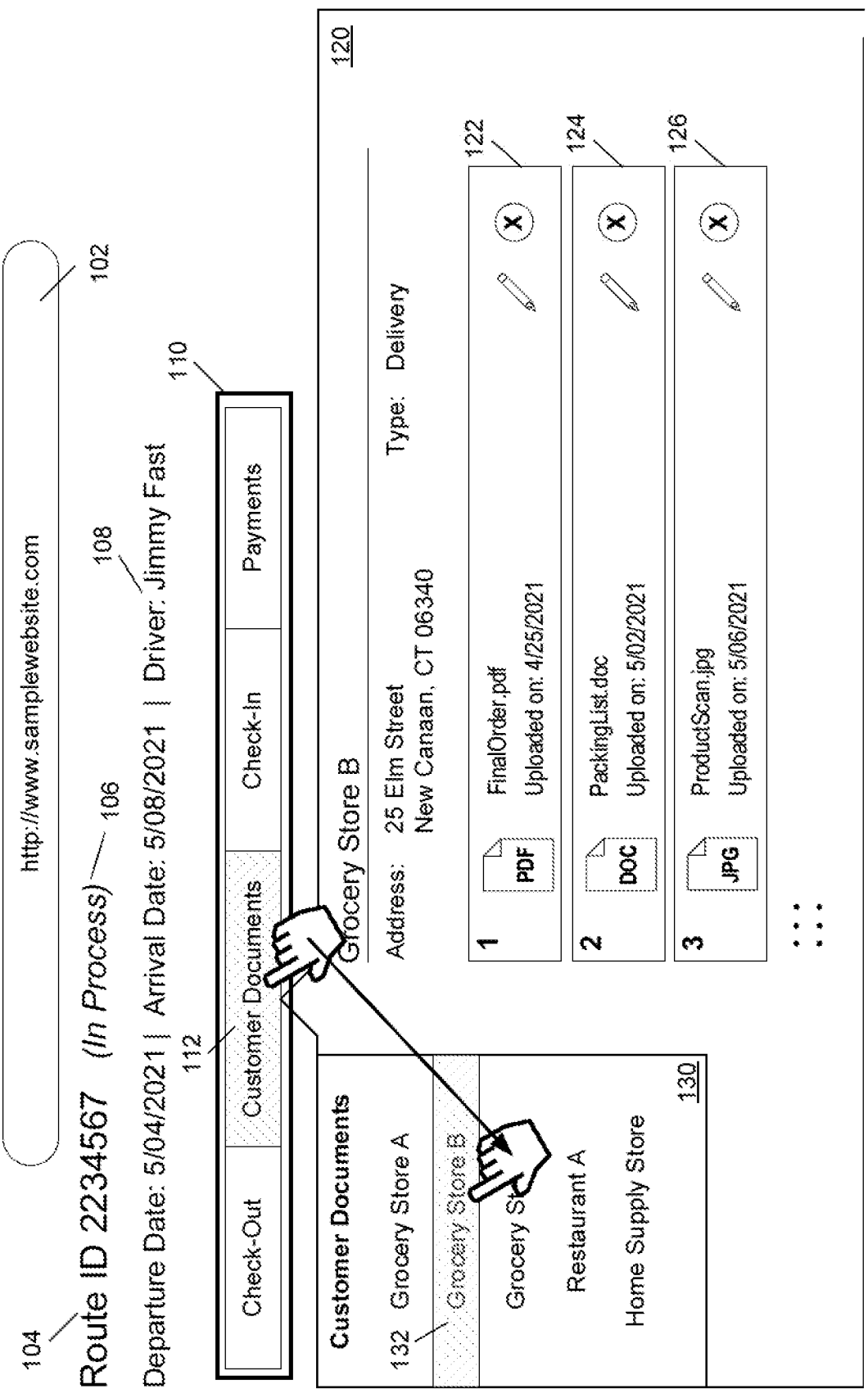
FIGS. 1A-1B are diagrams illustrating a user interface of a software application displaying files which have been uploaded to the software application in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Some software applications have functions and processes that are very time consuming for a user to perform on a user interface. As a non-limiting example, a settlement clerk may need to verify a number of electronic/digital documents such as orders, receipts, invoices, and the like, for a list of customers and/or routes. The documents may be of different types such as .pdf, .doc, .jpg, and the like. Here, the settlement clerk must open up each of the digital documents (e.g., using a user interface of the software application) and make selections on the user interface to update the software application to reflect that the documents have been received and verified. For a settlement clerk that must process hundreds or even thousands of documents on a daily basis, the verification process can be very time consuming.

To help users interact with the software application, the user may be able to attach documents throughout the application. In many instances, the software application may dedicate a respective page to each document that is attached. Thus, a user can open the respective page associated with an attached document and verify contents of the document by inputting entries into the user interface such as inputting text into fields, checking boxes, menu selections, and the like. A disadvantage of this solution is that the Settlement Clerk must navigate to many individual pages within the software application to update/verify each individual document.

The example embodiments provide a solution that takes the verification process out of the hands of the user, and instead relies on the file names (also referred to as filenames) of the individual electronic documents/files being attached to categorize the respective documents and enter values into the user interface of the software application in association with the respective documents without a need for a user to interact with the user interface. The process is automated. The process identifies segments of characters (e.g., smalls subsets of three characters, etc.) within the file name that correspond to different categories associated with a document. Furthermore, the values of the subsets of characters (e.g., "00", "01", "02", "03", etc.) may be mapped to different category values (e.g., "no customer", "customer A", "customer B", "customer C", etc. In the examples herein, the characters do not just refer to alphabetical characters and numerical characters, but may also include symbols such as periods (.) and file types such as (.doc, .pdf, .jpeg. and the like). Therefore, the term "characters" as described herein should be understood to include any value that may be used in a file name of an electronic computer file such as any value from a keyboard of the computer, etc.

As a non-limiting example, a customer name may be linked to the first two digits of a file name. In this example, the value "01" within the two digits of a file name of a first document may map to a restaurant, while value "02" in the same two digits of a file name of a second document may map to a grocery store, etc. Thus, the software can automatically identify features/categories/values associated with a document based on the file name of the document. It's also possible for documents to be mapped to the same category values. Furthermore, the example embodiments can simultaneously perform the categorization process for many documents (e.g., hundreds or even thousands of documents) based on file names of the respective documents. Thus, rather than the user manually enter data into the user interface for hundreds or thousands of documents which can take dozens of hours, the example embodiments can perform the categorization and user interface entry/update in real-time.

In some embodiments, the software may enable a user to set the mapping pattern using a keyboard that is newly created by the example embodiments. When activated, the keyboard may be used to define a mapping pattern for a file name. Here, the file name may be entered and the mapping button may be selected on the user interface. In response, the keyboard may be initialized and may be dynamically populated with characters from the file name. In other words, the keys within the keyboard may be labeled with letters from the file name thus mapping the file name to the keys on the digital keyboard. Accordingly, a user can easily choose the different characters to use for the different mapping patterns. Furthermore, the digital keyboard can control the display area of the keys using colors, shapes, extra characters, and the like, to help the user quickly understand the selections of the mapping pattern they are making. Thus, the user is clearly informed of the mapping pattern.

FIGS. 1A-1B illustrate a user interface of a software application displaying files which have been uploaded to the software application in accordance with example embodiments. Referring to FIG. 1A, a user interface 100 is displayed on a screen of a user computing device. The user interface may be part of a software application such as a web application (e.g., progressive web application, etc.), a mobile application, a locally installed application, and the like. Here, the user may navigate to the application using a search bar 102 to enter a URL of the software application. In response, the user interface 100 may be opened and may show a route identifier 104 associated with the user, a status identifier 106 indicating a current status of the shipment in this example, attributes 108 associated with the route such as a departure date, an arrival data, a driver, and the like.

Here, the user may click on or otherwise select a customer documents tab 112 from a menu bar 110 on the user interface 100, which causes the software application to display an additional page 120 for attaching documents 122, 124, and 126 associated with the respective route to the software application. The user may also input commands on a menu 130 to identify categories of data associated with the document such as a customer name, a function or feature of the software application associated with the document, a document type, and the like. The attributes associated with the document may be different than described herein. That is, the example of the customer name, the software features, and the document type, are just examples used herein. But there are many attributes that could be mapped to parts of a file name including, but not limited to, users associated with the document, periods of time associated with the document, places associated with the document, arrival times associated with the document, departure times associated with the document, details within the document such as product names, quantity values, prices, and the like.

As shown in FIG. 1A, for the user to upload a document they must access the user interface 100, then they must make a selection on the menu bar 110, and select the customer documents tab 112. In addition, the user must identify a category of the document (e.g., the customer name) by inputting commands into the menu 130 to choose a category value 132 for the document. This process may be even more time consuming if there are multiple categorizations that need to be performed. For example, if the document also had to be categorized based on its delivery date, the user would have to access another input field or menu and make a selection for this category as well.

FIG. 1B illustrates another example of a user interface 140 which includes a page with multiple attached documents visible via an attachment list. In this example, four attached documents are shown via four document entries (i.e., entry 150, entry 160, entry 170, and entry 180 within the user interface 140. Here, each entry may include a divider or boundary which distinguishes it from the other entries (attached documents) on the user interface. The entries represent four documents which have four different file names and which have been attached or otherwise uploaded to the software application. For example, the entry 150 includes a document identifier 151 (e.g., file name, etc.), document attributes 152 such as upload details, last updated details, user details, etc. The entry 150 may also include a plurality of categories of data (e.g., three categories of data in this example) which must be verified via a plurality of drop-down menus 153, 154, and 155, respectively. Each of the other entries 160, 170, and 180, include the same details as the entry 150 including the document identifier, the document attributes, and the plurality of drop-down menus.

In order for the user to verify each of these documents, the user must manipulate the drop-down menus within each of the entries on the user interface 140. In other words, to verify the four documents corresponding to the entry 150, the entry 160, the entry 170, and the entry 180, the user must open the drop-down menus associated with each respective entry, and enter a category value therefrom via twelve separate drop-down menus (i.e., three menus per document). In FIG. 1B, the user has opened drop-down menu 185 corresponding to the category of document type and selected a value 186 corresponding to invoice type. This process is very tedious and also subject to human error.

Figure 2:
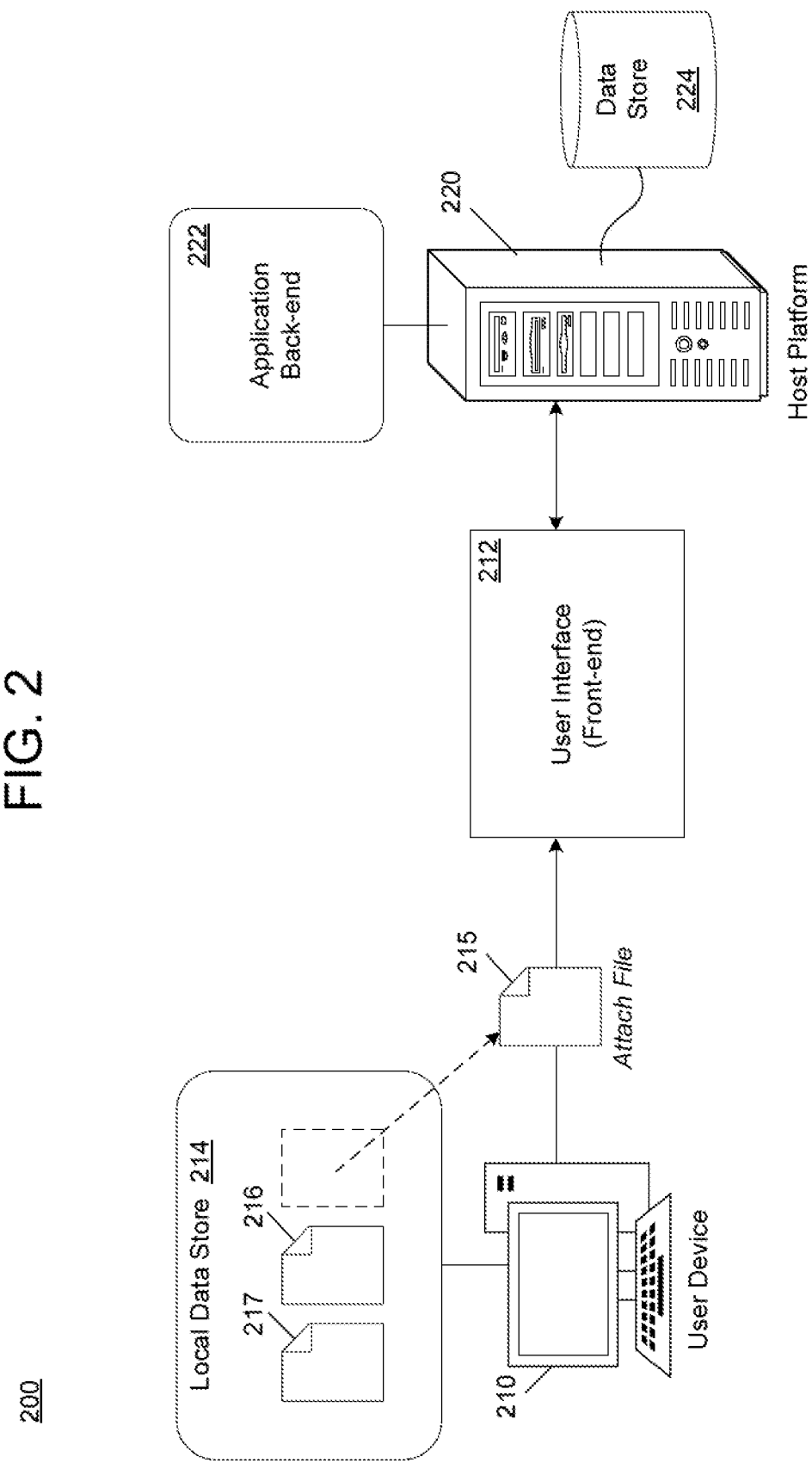
FIG. 2 is a diagram illustrating a process of a user uploading files to the software application in accordance with various example embodiments.

FIG. 2 illustrates a process 200 of a user attaching files to the software application in accordance with various example embodiments. Referring to FIG. 2, a host platform 220 hosts a software application that is available to users via the Internet such as a mobile application, a web application, or the like. Here, the host platform 220 hosts a back-end 222 of the software application. Meanwhile, users can download and install a front-end of the application to a user device 210. Here, the front-end of the application includes a user interface 212 for the user to communicate with the back-end 222 of the software application. Here, the host platform 220 may be a web server, a cloud platform, a database, a combination of devices, and the like. As another example, the user device 210 may be a personal computer, a laptop, a tablet, a mobile device, a server, and the like.

For example, the user device 210 may have a plurality of electronic documents 215, 216, and 217 stored in a local data store 214 that the user wishes to upload to the host platform 220 of the software application. The user may use the user interface 212 to upload/attach the plurality of electronic documents 215, 216, and 217 and transmit the plurality of electronic documents 215, 216, and 217 to the back-end 222 of the software application via an electronic computer network such as the Internet. In response, the host platform 220 may store the plurality of electronic documents 215, 216, and 217 in a data store 224. In addition, the user interface 212 may be used to display information about each of the attached documents such as the document type, the customer name associated with the document, an application process or feature associated with the document, and the like.

Figure 3B:
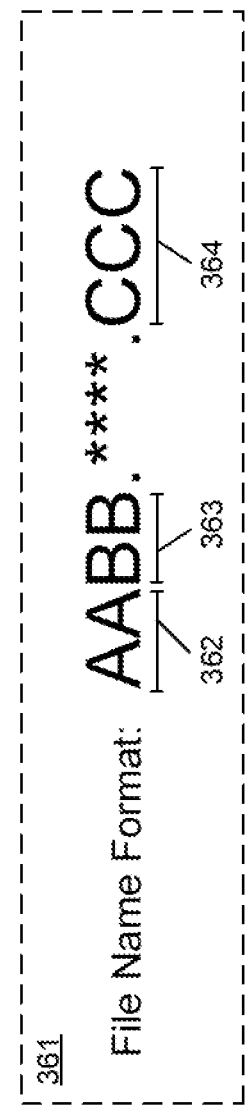

FIGS. 3A-3C illustrate a process of categorizing files and displaying category values via a user interface based on file names of the files, in accordance with example embodiments. Referring to FIG. 3A, a user interface 300A is shown that includes a list of files (e.g., electronic files, digital files, electronic documents, digital documents, etc.) which have been uploaded to a host software application such as the application hosted by the host platform 220 in FIG. 2. In this example, the electronic files may include word documents (e.g., .doc., .txt., etc.), spreadsheets, .pdfs, images (e.g., .jpeg, etc.), XML files, JSON files, and the like. The host may identify a file name for each of the documents and display a plurality of entries for the plurality of documents within the user interface 300A. In this example, there are five entries corresponding to five files, respectively, and each entry is separated by a line 316 that distinguishes the different entries from each other.

The first entry in the user interface 300A is for a computer file with a file name "0301.0001.pdf". An identifier 310 of the file name may be displayed within the entry on the user interface 300A. In addition, details about the file may be obtained automatically by the software and displayed next to the identifier 310 of the file name within the entry such as the user who uploaded the document, the date it was uploaded on, and the like. Furthermore, in the example embodiments, the entry also includes a plurality of category fields which include a plurality of default values 311a, 312a, and 313a, stored therein. Furthermore, UI element 314 enables a user to modify the data associated with the corresponding file when selected. Also, UI element 315 enables the user to delete a file from the list.

The category fields may be for storing/containing category values for features associated with the computer file such as a type of the file. The category values may be predefined in a mapping table as further described in FIG. 3B below. For example, for a category such as document type, the category values may include invoice, receipt, work order, delivery notice, and payment. Thus, the category of document type may have five possible category values of invoice, receipt, work order, delivery notice, and payment. In FIG. 3A, each of the default values 311a, 312a, and 313a, specifies that the category data has not been verified. FIG. 3A further includes a display of four more entries include file identifiers 320, 330, 340, and 350, respectively. Here, sets of default values 321a, 322a, 323a, 331a, 332a, 333a, 341a, 342a, 343a, and 351a, 352a, 353a, are shown in the four additional entries on the user interface 300A corresponding to the file identifiers 320, 330, 340, and 350, respectively. The task of changing all of these default values is traditionally a task performed by a user clicking on the values on the user interface 300A and inputting the details via an input mechanism such as a mouse or a keyboard.

As further explained below, the example embodiments can automatically identify one or more categories of a file and one or more category values within the one or more categories, based on one or more subsets of characters (e.g., 1 character, 2 characters, 3 characters, etc.) within a file name of the file and one or more mapping keys stored by the software application/host platform. As such, the software application described herein can automatically categorize features of an uploaded computer file using the file name of the computer file, and populate the user interface with the one or more mapped category values in one or more predetermined fields without requiring the user to enter data into the user interface. Instead, short sequences of characters within the file name can be used to identify both a category of the file, and a value for the file within that category.

FIG. 3B illustrates a user interface 360 for defining a mapping pattern for a file name. As an example, the user interface 360 may be opened by selecting a mapping pattern option 302 in the user interface 300A shown in FIG. 3A. However, it should also be appreciated that the user interface 360 does not need to be opened this way or opened at all. In some cases, the user interface 360 may be a drop-down menu, a pop-up menu, embedded within the user interface 300A shown in FIG. 3A, or the like. In this example, the user interface 360 includes a file name format 361 that defines three different categories of data associated with the file. The three categories are represented by three letters (A, B, and C) and are assigned to three different subsets of characters within the file name format 361.

For example, a first category is assigned to a subset of characters 362 which correspond to the first two characters/positions in the file name format 361. Likewise, a second category B is assigned to a subset of characters 363 which correspond to the third and fourth positions within the file name format 361. Furthermore, a third category C is assigned to a subset of characters 364 which correspond to the last three positions within the file name format 361 which are reserved for the filetype identifier such as .pdf, .doc, .xml, .jpg, etc. Each of the categories may be assigned to different subsets of characters within the file name. In some cases, the subsets may include mutually exclusive subsets within the file name. It should also be appreciated that not all of the characters within the file name need to be used. For example, intermittent characters that are unused for mapping to categories may be present in the file name.

To ensure that the correct value for the category is read from the file name, the position values of each of the subsets may be stored in a mapping key from among a plurality of mapping keys 371, 372, and 373. For example, the position of the first subset (the subset of characters 362) may be stored in a field 374 of a mapping key 371 along with category value mappings 375 which map different possible file name values to category values. The individual mappings between category values and file name values within the plurality of mapping keys 371, 372, and 373 may be modified via the user interface 360 or otherwise modified by interacting with database tables, data files, dictionaries, indexes, or the like.

A sample mapping process may receive a computer file that includes a file name of "0204.0123.jpg". Using the mapping file format 361, the host may categorize the file into category value "Customer Files" in category A based on the mapping key 371. In addition, the host may further categorize the file into the category value "Restaurant A" based on the mapping key 372, and the host may further categorize the file into the category value "Receipt" based on the mapping key 373. Thus, three categories can be identified from the same file name and three values within those categories can be identified using the combination of the file name format 361 and the plurality of mapping keys 371, 372, and 373.

Referring to FIG. 3C, a user interface 300B is shown which comprises an automated conversion of the user interface 300A shown in FIG. 3A, based on the mapping data included in the file name format 361 and the plurality of mapping keys 371, 372, and 373 shown in FIG. 3B. Here, the host may automatically categorize the files within the five entries in response to a run categorizer button 304 shown in FIG. 3A, or selection of some other UI element. In response, the host may auto-categories the five files based on the five file names (e.g., the file identifiers 310, 320, 330, 340, and 350). The host may replace the default values 311a, 312a, 313a, 321a, 322a, 323a, 331a, 332a, 333a, 341a, 342a, 343a, and 351a, 352a, 353a, with mapped category values 311b, 312b, 313b, 321b, 322b, 323b, 331b, 332b, 333b, 341b, 342b, 343b, and 351b, 352b, 353b as shown in the user interface 300B of FIG. 3C, based on the file name format 361 and the plurality of mapping keys 371, 372, and 373 shown in FIG. 3B. In particular, using the respective file identifiers of each of the computer files, the host may identify different values for the same categories for the files.

Figure 4A:
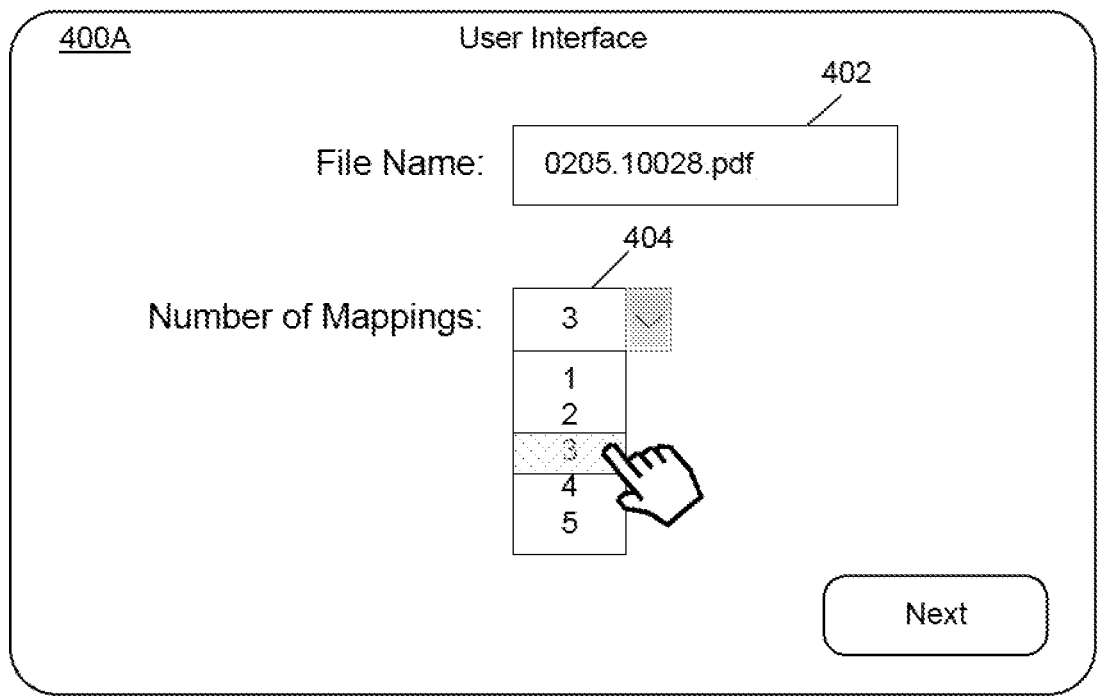
FIGS. 4A-4J are diagrams illustrating processes of mapping file names to categories and category values in accordance with example embodiments.

According to an embodiment, the host system may also provide a novel user interface for establishing a mapping pattern. The user interface may include a digital keypad displayed within the user interface with interactive features that facilitate a user's understanding of the process of mapping a string such as a file name or other text value, to a plurality of categories. Referring to FIG. 4A, a user interface 400A is shown which includes a field 402 for a file name and a drop-down box 404 for setting a number of mappings to perform with the file name. In this example, the user selects three mappings (i.e., three categories). As an example, the user interface 400A may be opened in response to a user selecting the settings button 306 in the user interface 300B shown in FIG. 3C.

In response to the user entering the file name and selecting a value for the mappings, the user may select to move to a next step in the process and the host may display a user interface 400B with a mapping pattern field 412 capable of defining a mapping pattern, and mapping key elements 414, 416, and 418 identifying the three mappings/categories. Here, the user may identify which positions within the file name are associated with each mapping key by using a letter or other character predefined in advance.

In this example, the user may input the character "A" to specify that the character position corresponds to a mapping for category A. Likewise, the character "B" may be used to specify positions that correspond to mapping category B and the character "C" may be used to specify positions that correspond to the mapping category C. Here, any position of the file name can be used including the symbols, periods, etc., and the file type value at the end of the file name. For characters that are not to be used for mapping, the user may enter a null value such as "*" or the like to signify that these characters are not currently being used for mapping. In this way, different subsets of characters may be used, and intervening/unused characters may also be identified in the file name.

Figure 4B:
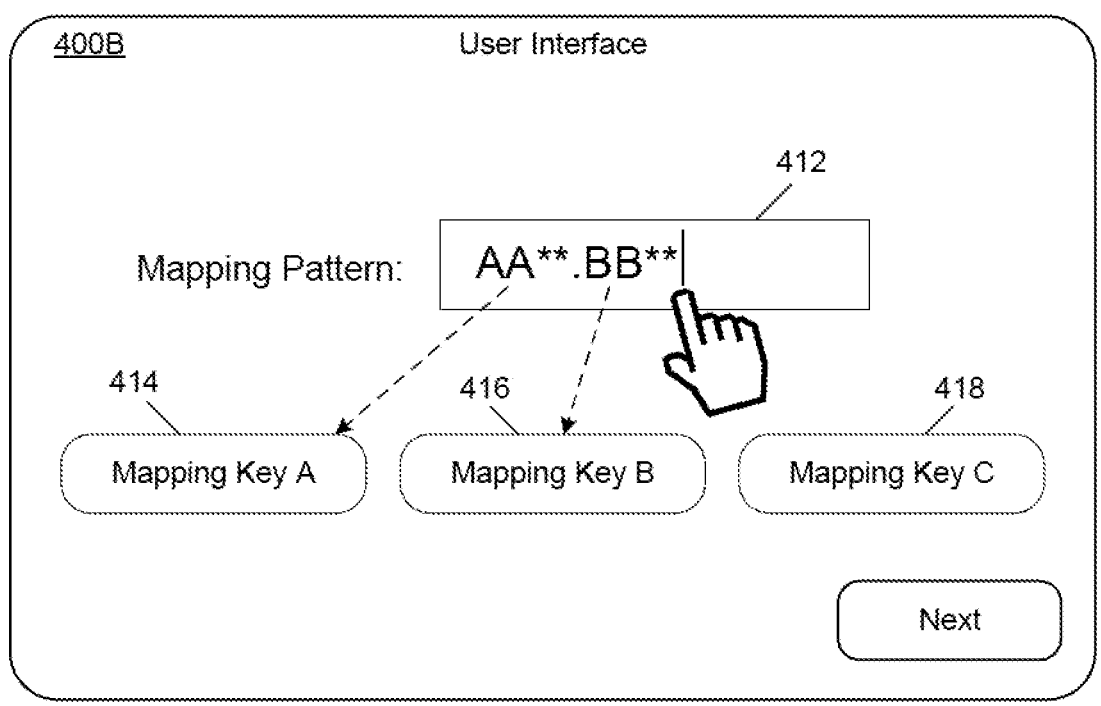
Figure 4C:
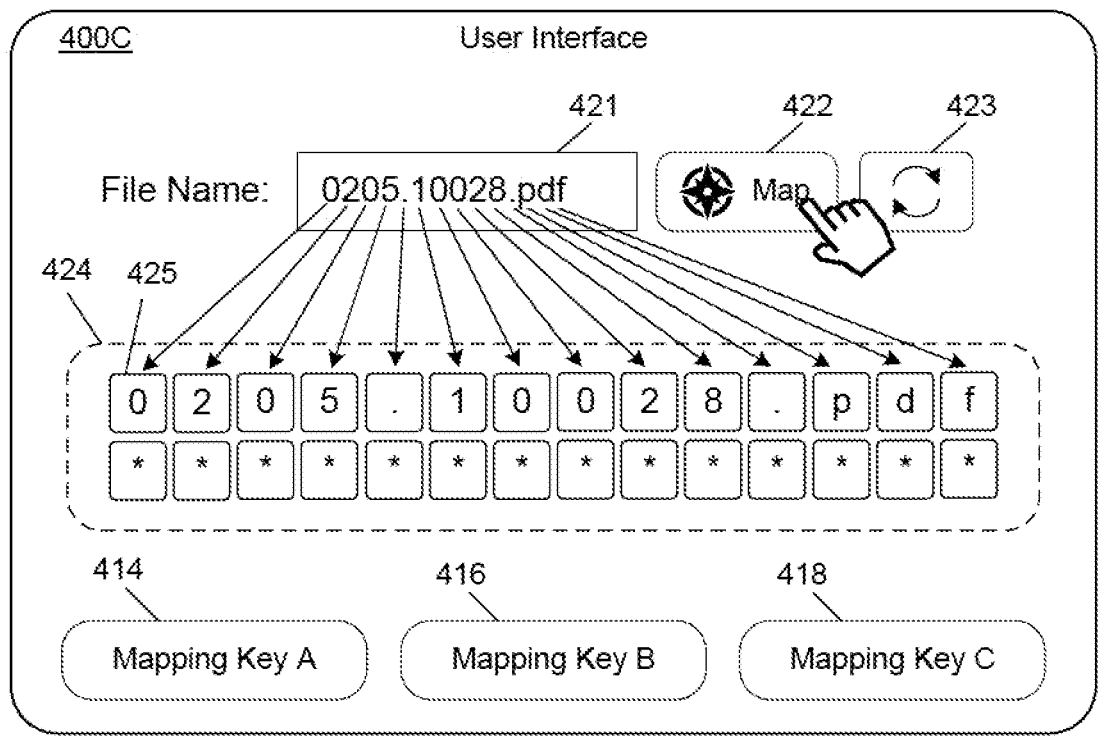

FIG. 4C illustrates a user interface 400C that may be used instead of or in conjunction with the user interfaces 400A and 400B shown in FIGS. 4A and 4B. Here, the user interface 400C includes an input field 421 configured to receive a string value such as a file name. The user interface 420 also includes a mapping button 422 which when selected maps the individual characters within the string value in the input field 421 to keys on a digital keypad 424. In particular, a key 425 within the digital keypad 424 is mapped to a first position of the file name in the input field 421. Thus, a display area on a face of the key 425 within the digital keypad 424 is populated with the number "1" corresponding to the first character in the file name displayed within the input field 421. This same process may be repeated for each character in the sequence of characters in the file name. The sequence of characters may be mapped to a sequence of keys on the digital keypad 424. Other mapping arrangements are also possible. For example, some characters may map to a different row on the keypad, etc.

The digital keypad 424 includes character values from the file name embedded or otherwise integrated into display areas on top of the keys within the digital keypad 424. Thus, a user can easily identify which key corresponds to which position of the file name.

Figure 4D:
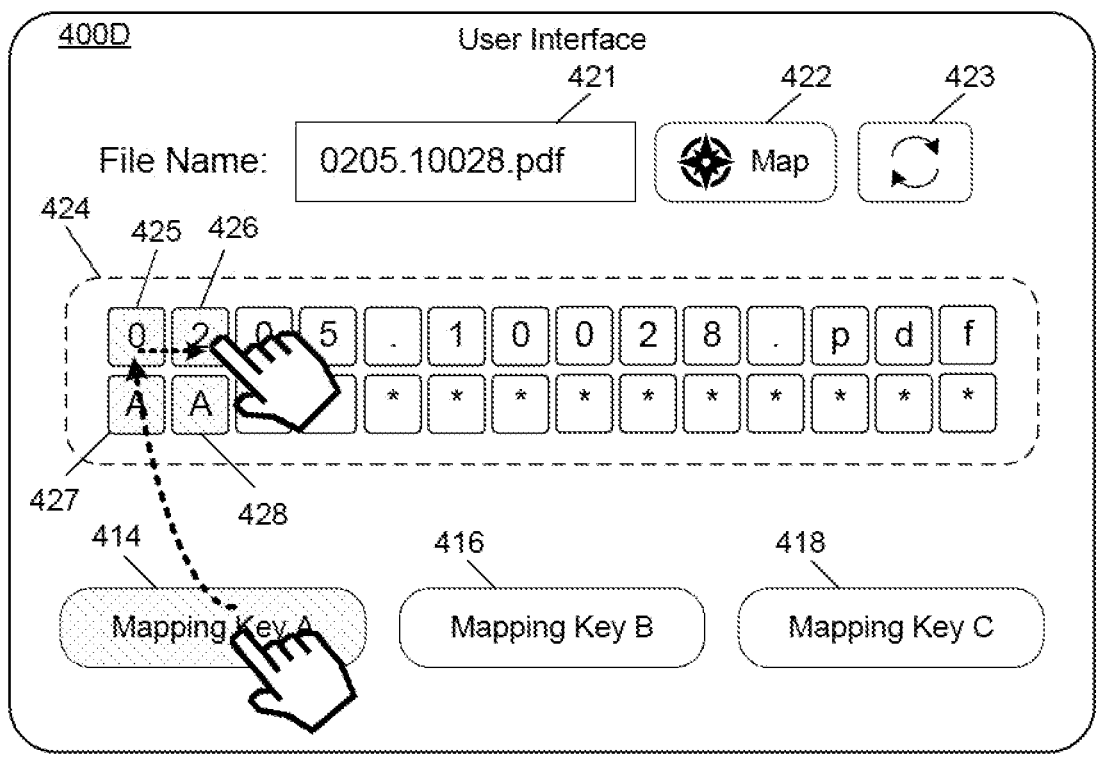

FIG. 4D illustrates a user interface 400D which is a continuation of the user interface 400C shown in FIG. 4C. Here, the user may select/click on the mapping key element 414 corresponding to the first category (category A) to activate the category for purposes of mapping. Once activated, the user may select keys on the digital keypad 424. In response, the host may detect which keys on the keypad are selected and assign those keys to category A and insert the positions of the characters in the corresponding mapping key for category A. In this example, the first two positions of the file name corresponding to characters "02" are selected for category A by a user selecting the first two keys 425 and 426 on the top row of the digital keypad 424 via a cursor, touch input, or other input mechanism. For example, the user may slide their finger across the screen and selected the mapping key element 414 to activate the letter A. Next, the user may slide their finger up and across the first two keys 425 and 426. In response, the host may display the category value A in the two keys 427 and 428 below the selected first two keys 425 and 426 to identify which category they are now mapped to as a result of the user input.

Figure 4E:
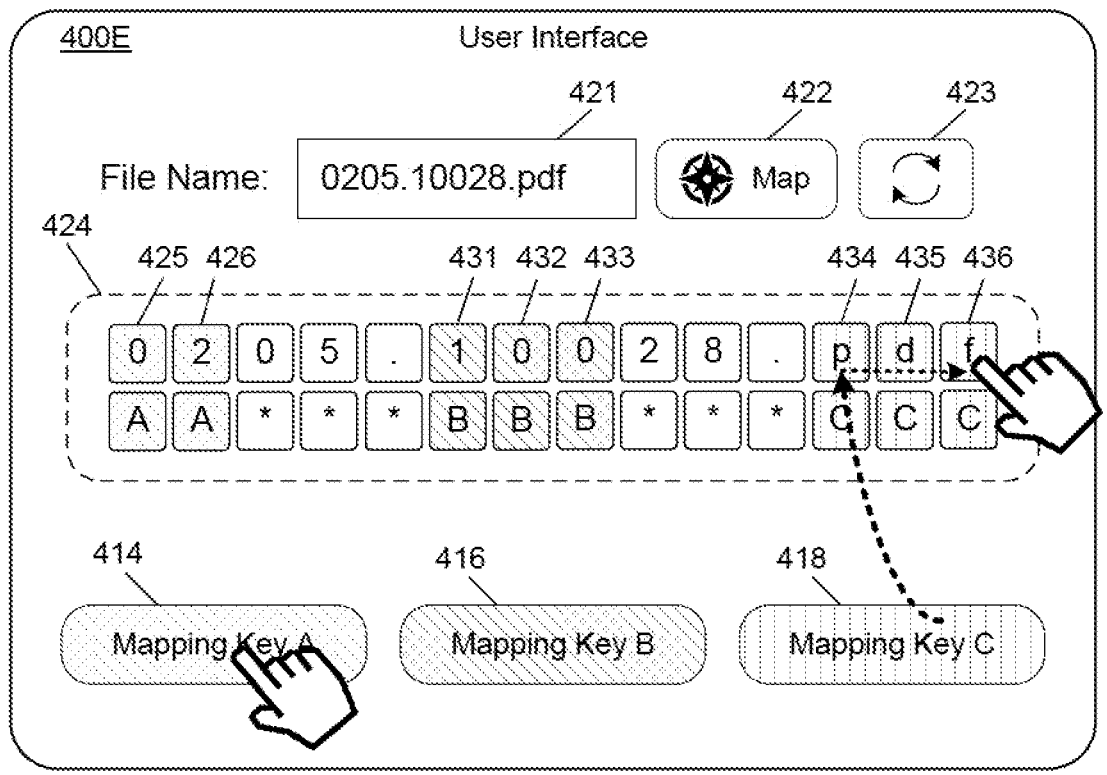

In response to the user selecting the first two keys 425 and 426, the host may render a color within the digital keys and the same color within the mapping key element 414 to let the user know "visually" which parts of the file name are mapped to category A. FIG. 4E illustrates a user interface 400E where the user has continued to fill-in the keypad 424 with the mapping elements including a second subset of positions within the file name corresponding to characters "100" being mapped to keys 431, 432, and 433, and a third subset of positions in the file name corresponding to characters "jpg" being mapped to keys 434, 435, and 436. Each of the three subsets are mapped and visually shown using three different colors on the user interface 400E. For example, the keys 431, 432, and 433 may be rendered with a different color than the keys 425 and 426. Likewise, the keys 434, 435, and 436 may be rendered with a different color than all the other keys. Thus, a user may clearly visualize which parts of the file name are used for mapping which categories.

Figure 4F:
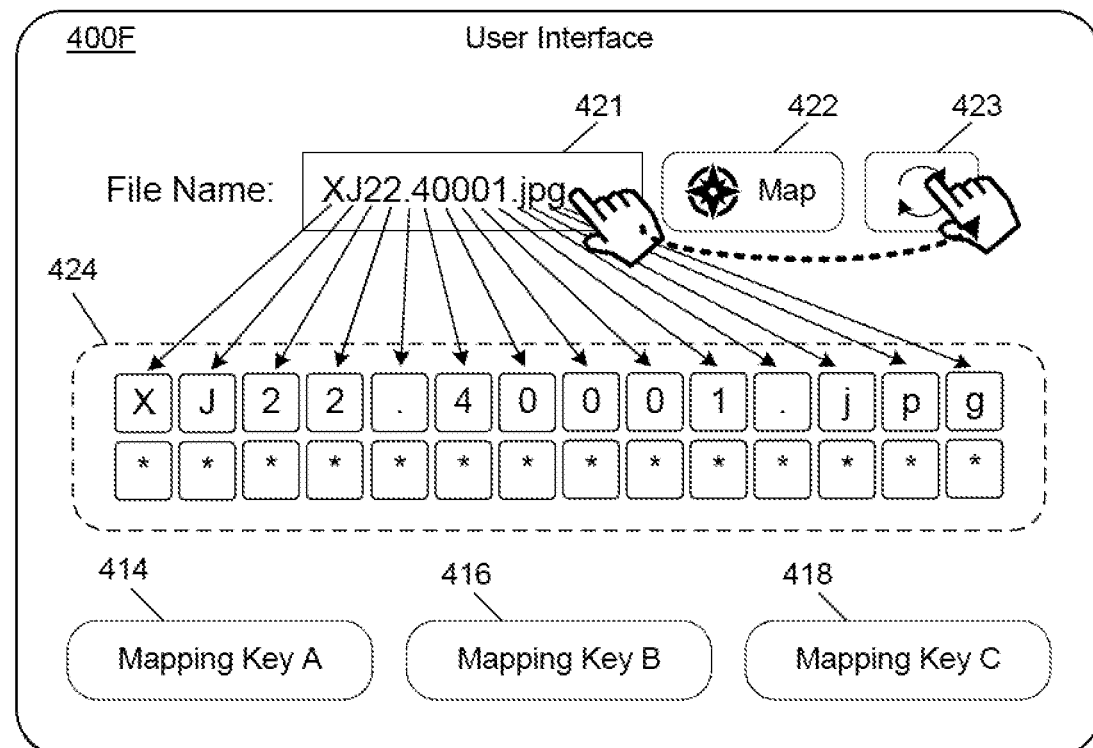

FIG. 4F illustrates a user interface 400F in which a user has selected the refresh button 423 causing the text input field 421 to reset to empty or default value. Thus, the user can enter a new file name for pattern mapping into the text input field 421. In addition, the user can select the mapping button 422 to cause the string of characters within the text input field 421 to be mapped to keys on the digital keypad 424. Thus, the user can keep creating new mappings until desired.

Figure 4G:
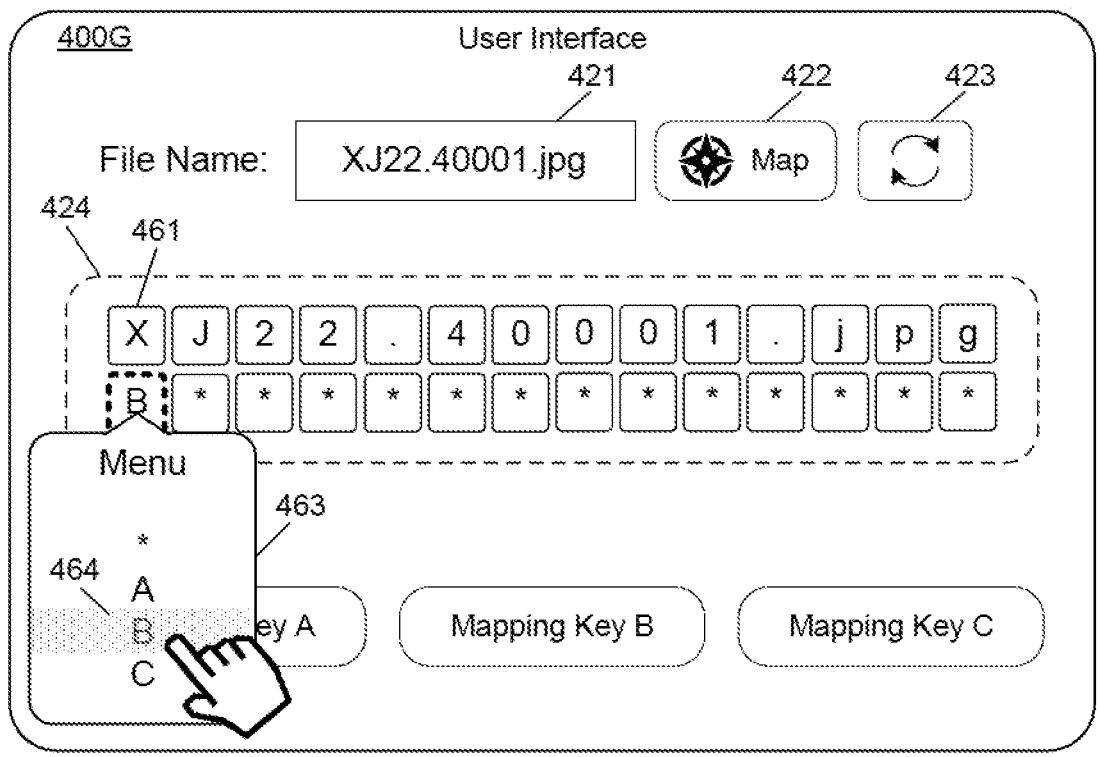

FIG. 4G illustrates a user interface 400G for mapping the newly entered string of characters within the text input field 421 to keys on the digital keypad 424. Here, the user may click on a key 462 underneath a key 461 which is mapped to a positional value within the file name to set a category for the positional value. In response, the host may open a pop-over menu 463 with various category identifiers enabling the user to specify which category this positional value corresponds to.

Figure 4H:
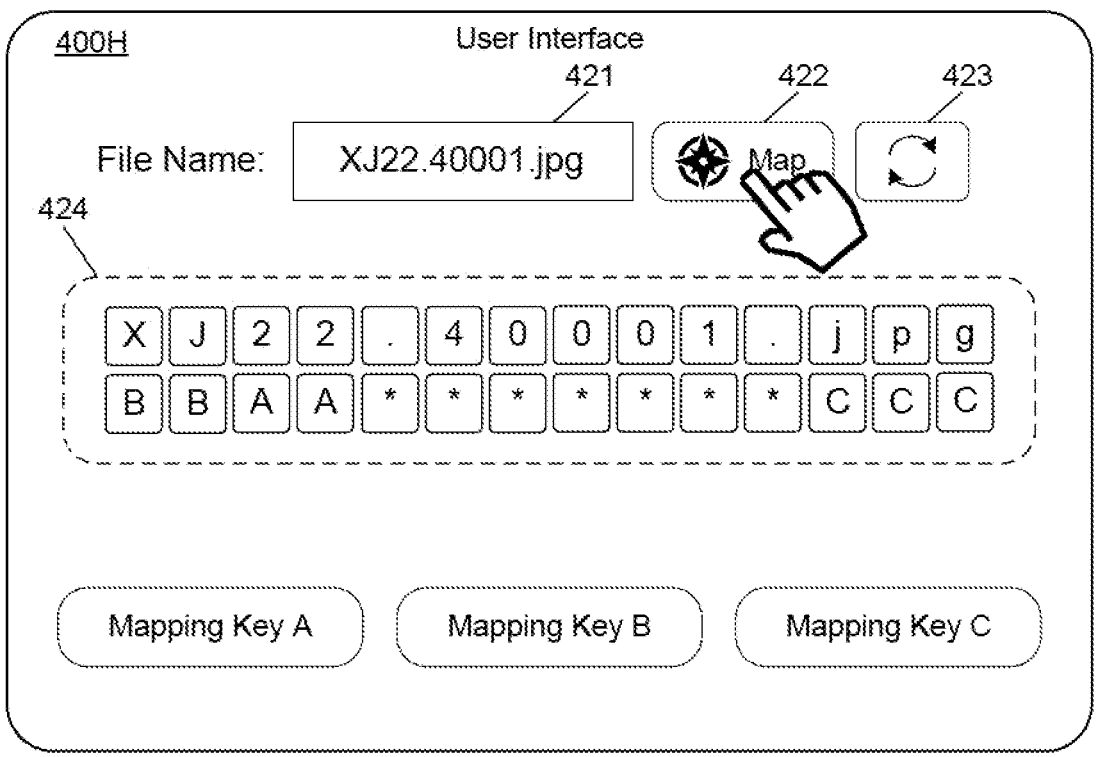

FIG. 4H is a continuation of FIG. 4G. In FIG. 4H, a user interface 400H includes a filled-in digital keypad 424 with three different subsets of characters labeled for three different categories. In this example, a set of characters that are not used for mapping purposes intervene two of the subsets (AA and CCC). The host uses the places/position values to identify thee intervening/non-mapping positional values within the file name.

Figure 4I:
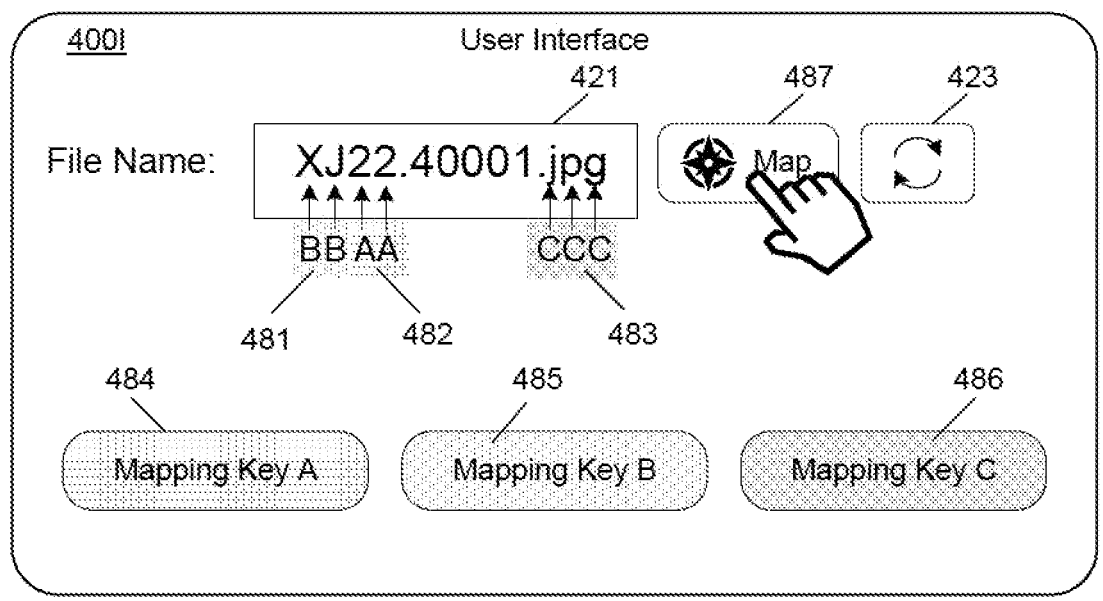

FIG. 4I illustrates a user interface 400I for establishing a mapping pattern using a monochrome display of characters/category identifiers underneath the text input field 421 to identify which categories map to which positional places within the string/file name within the text input field 421. This may be performed by clicking on the mapping button 487 shown in FIG. 4I. Here, the user interface 400I may remove the digital keypad 424 and replace it with the images 481, 482, and 483 which identify the three subsets of characters in the file name for purposes of categorization, and the respective categories that they are mapped to.

Figure 4J:
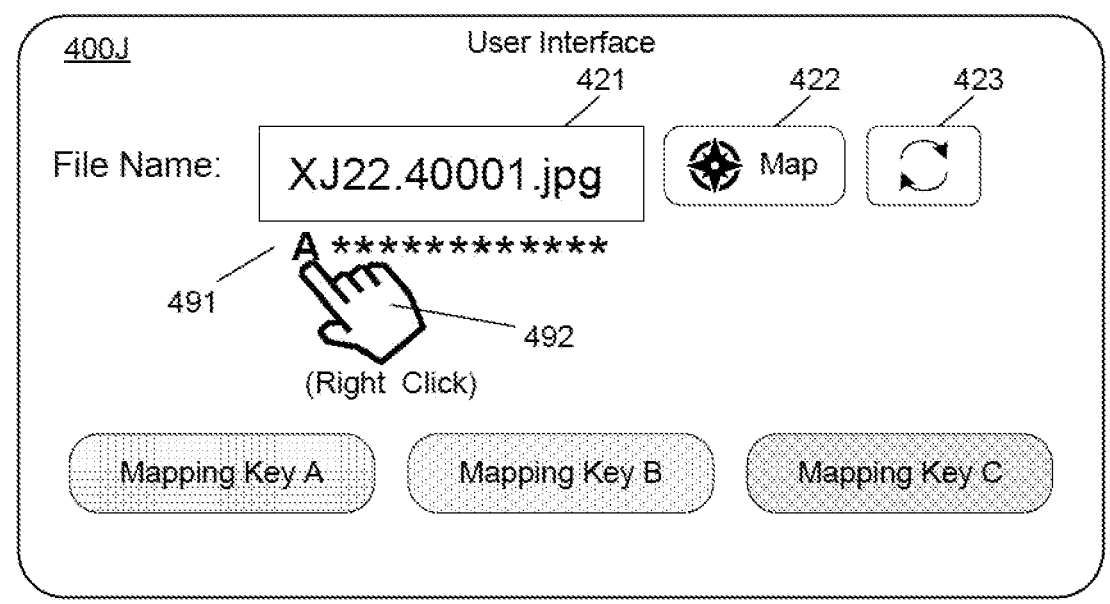

FIG. 4J illustrates a user interface 400J that may also be used for establishing a mapping pattern. In this example, an interactive string 491 is displayed below the string within the text input field 421. Here, the interactive string 491 includes a number of symbols (*) corresponding to the number of positional values within the string within the text input field 421. The user may click on each symbol and set the category for that position using a cursor 492 or touch input, etc. The user may select and categorize each of the positional values by simply clicking on a corresponding symbol located in the interactive string 491 below the position within the text input field 421. For example, the user may click on the symbol (*) for the first position of the file name corresponding to the value X in the text input field. In response to a first click, the user interface may select the category A. In response to a second click, the user interface may select the category B. In response to a third click, the user interface may select the category C. When the user reaches the last category, the next click may start the sequence again with the first category A.

FIG. 5 is a diagram illustrating a method of mapping an identifier within a file name to a category value and displaying the category value via a user interface in accordance with an example embodiment. Referring to FIG. 5, in 510, the method may include receiving an electronic computer file comprising a file name and storing the electronic computer file with the file name in memory. In some embodiments, the method may include receiving multiple electronic files. However, for simplicity, one file is described in 510.

In 520, the method may include identifying a subset of characters within the file name which correspond to a data category of a software application. The subset of characters may be a portion but not all of the file name, and may include characters, periods or dots in the file name, document types, and the like. In 530, the method may include mapping a value of the identified subset of characters to a category value among a plurality of category values in the data category. Depending on the value for the subset of identified characters, the mapping may map to different category values. For example, a subset value of "03" may map to a check-in page of a software application while a subset value of "08" may map to a check-out page of the software application.

In 540, the method may include displaying an identifier of the electronic computer file on a user interface of the software application. It should also be appreciated that multiple documents/document identifiers may be displayed in the user interface at the same time. In 550, the method may include dynamically populating a predefined field within the user interface corresponding to the data category with the mapped category value. For example, the displaying may initially include displaying a default value within the predefined field and dynamically replacing the default value within the predefined field with the mapped value in response to detecting a run categorization input via the user interface. It is not necessary for a default value to be displayed. As another example, the mapped value may automatically be identified by the software application and added to the predefined field regardless of whether the default value is displayed therein by the software application.

In some embodiments, the identifying may include identifying a plurality of respective subsets of characters within the file name which correspond to a plurality of different data categories of the software application, mapping a plurality of values of the plurality of respective subsets to a plurality of category values of the plurality of different categories, respectively, and populating a plurality of predefined fields associated with the electronic computer file within the user interface with the plurality of mapped category values, respectively. In some embodiments, two subsets of characters among the plurality of respective subsets of characters are intervened by an intervening string of characters within the file name which are not used for categorization.

In some embodiments, the receiving may include receiving a plurality of electronic computer files with a plurality of file names, respectively, mapping a plurality of subsets of characters within the plurality of file names, respectively, to a plurality of category values, and displaying the plurality of mapped category values with identifiers of the plurality of documents, respectively, via the user interface. In some embodiments, the mapping may include mapping the value of the identified subset of characters to the category value based on a mapping key stored in the memory which maps different possible values of the identified subset of characters to different category values of the data category.

In some embodiments, the method may further include receiving an input of a new file name via the user interface, and in response, displaying an additional user interface for creating a mapping pattern for the new file name. In some embodiments, in response to detecting a selection of the mapping button, the method may further include initializing a display a digital keypad on the additional user interface and embedding a sequence of characters within the new file name into content areas a sequence of keys on the digital keypad, respectively. In some embodiments, the method may further include detecting a selection of a mapping key from among a plurality of mapping keys, and detecting a selection of a key on the digital keypad. In some embodiments, the method may further include illuminating the selected key on the digital keypad with a color that is previously mapped to the mapping key in the memory.

FIG. 6 is a diagram of a server node 600 according to some embodiments. The server node 600 may host the software application described in the example embodiments, and may include a general-purpose computing apparatus that may execute program code to perform any of the functions described herein. The server node 600 may include an implementation of the host platform 220 shown in FIG. 2, in some embodiments. It should also be appreciated that the server node 600 may include other unshown elements according to some embodiments and may not include all of the elements shown in FIG. 6.

Server node 600 includes processing unit(s) 610 (i.e., processors) operatively coupled to communication device 620, data storage device 630, input device(s) 640, output device(s) 650, and memory 660. Communication device 620 may facilitate communication with external devices, such as an external network or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into the server node 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM). In some embodiments, the data storage device 630 may store user interface elements in tabular form. For example, one or more columns and one or more rows of user interface elements may be displayed in a two-dimensional spreadsheet, table, document, digital structure, or the like.

Application server 631 and query processor 632 may each comprise program code executed by processing unit(s) 610 to cause server node 600 to perform any one or more of the processes described herein. Such processes may include estimating selectivities of queries on tables 634 based on statistics 633. Embodiments are not limited to execution of these processes by a single computing device. Data storage device 630 may also store data and other program code for providing additional functionality and/or which are necessary for operation of server node 600, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory configured to store a file name format; and
a processor coupled to the memory, the processor configured to
receive commands entered via a user interface;
assign a subset of character positions within the file name format to a data category and generate a mapping key which comprises a plurality of possible values for the subset of character positions mapped to a plurality of category values for the data category, based on the commands entered via the user interface;
receive an electronic computer file comprising a file name that adheres to the file name format and store the electronic computer file in the memory;
identify a subset of characters within the subset of positions within the file name which correspond to the data category;
map the identified subset of characters within the file name to a category value from among the plurality of category values based on the mapping key;
display an identifier of the electronic computer file via a software application; and
dynamically populate a predefined field within the software application corresponding to the data category with the mapped category value.

2. The computing system of claim 1, wherein the processor is configured to initially display a default value within the predefined field and dynamically replace the default value within the predefined field with the mapped category value in response to detecting a run categorization input via the user interface.

3. The computing system of claim 1, wherein the processor is configured to identify a plurality of respective subsets of character positions within the file name which correspond to a plurality of different mapping keys of the file name format, respectively, map a plurality of values of the plurality of respective subsets to a plurality of category values of the plurality of mapping keys, respectively, and populate a plurality of predefined fields within the user interface with the plurality of mapped category values from the plurality of mapping keys, respectively.

4. The computing system of claim 3, wherein two subsets of characters among the plurality of respective subsets of characters are intervened by an intervening string of characters within the file name which are not used for categorization.

5. The computing system of claim 1, wherein the processor is configured to receive a plurality of electronic computer files with a plurality of file names that adhere to the file name format, respectively, map a plurality of subsets of characters within the plurality of file names, respectively, to a plurality of category values, and display the plurality of mapped category values with identifiers of the plurality of electronic computer files, respectively, via the user interface.

6. The computing system of claim 1, wherein the processor is configured to map the subset of characters to a menu item stored in a drop-down menu based on the mapping key, and display the category value in the drop-down menu.

7. The computing system of claim 1, wherein the processor is further configured to receive an input of a new file name via the user interface, and in response, display an additional user interface for creating a mapping pattern for the new file name.

8. The computing system of claim 7, wherein, in response to detecting a selection of a mapping button, the processor is configured to initialize a display a digital keypad on the additional user interface and embed a sequence of characters within the new file name into content areas inside digital keys on the digital keypad, respectively.

9. The computing system of claim 8, wherein the processor is further configured to detect a selection of a mapping key from among a plurality of mapping keys, and detect a selection of a digital key on the digital keypad.

10. The computing system of claim 9, wherein the processor is further configured to illuminate the selected digital key on the digital keypad with a color that is previously mapped to the mapping key in the memory.

11. A method comprising:
storing a file name format in storage;
receiving commands entered via a user interface;
assigning a subset of character positions within the file name format to a data category and generate a mapping key which comprises a plurality of possible values for the subset of character positions mapped to a plurality of category values for the data category, based on the commands entered via the user interface;
receiving an electronic computer file comprising a file name that adheres to the file name format and storing the electronic computer file in storage;
identifying a subset of characters within the subset of positions within the file name which correspond to the data category;
mapping the identified subset of characters within the file name to a category value from among the plurality of category values based on the mapping key;
displaying an identifier of the electronic computer file via a software application; and
dynamically populating a predefined field within the software application corresponding to the data category with the mapped category value.

12. The method of claim 11, wherein the displaying comprises initially displaying a default value within the predefined field and dynamically replacing the default value within the predefined field with the mapped category value in response to detecting a run categorization input via the user interface.

13. The method of claim 11, wherein the identifying comprises identifying a plurality of respective subsets of character positions within the file name which correspond to a plurality of different mapping keys of the file name format, respectively, mapping a plurality of values of the plurality of respective subsets to a plurality of category values of the plurality of mapping keys, respectively, and populating a plurality of predefined fields associated with the electronic computer file within the user interface with the plurality of mapped category values from the plurality of mapping keys, respectively.

14. The method of claim 11, wherein the receiving comprises receiving a plurality of electronic computer files with a plurality of file names that adhere to the file name format, respectively, mapping a plurality of subsets of characters within the plurality of file names, respectively, to a plurality of category values, and displaying the plurality of mapped category values with identifiers of the plurality of electronic computer files, respectively, via the user interface.

15. The method of claim 11, wherein the mapping comprises mapping the subset of characters to a menu item stored in a drop-down menu based on the mapping key, and displaying the mapped category value in the drop-down menu.

16. The method of claim 11, wherein the method further comprises receiving an input of a new file name via the user interface, and in response, displaying an additional user interface for creating a mapping pattern for the new file name.

17. The method of claim 16, wherein, in response to detecting a selection of a mapping button, the method further comprises initializing a display a digital keypad on the additional user interface and embedding a sequence of characters within the new file name into content areas inside digital keys on the digital keypad, respectively.

18. The method of claim 17, wherein the method further comprises detecting a selection of a mapping key from among a plurality of mapping keys, and detecting a selection of a digital key on the digital keypad.

19. The method of claim 18, wherein the method further comprises illuminating the selected digital key on the digital keypad with a color that is previously mapped to the mapping key in the memory.

20. A non-transitory computer-readable medium comprising instructions which when executed by a processor cause a computer to perform a method comprising:
storing a file name format in storage;
receiving commands entered via a user interface;
assigning a subset of character positions within the file name format to a data category and generate a mapping key which comprises a plurality of possible values for the subset of character positions mapped to a plurality of category values for the data category, based on the commands entered via the user interface;
receiving an electronic computer file comprising a file name that adheres to the file name format and storing the electronic computer file in storage;
identifying a subset of characters within the subset of positions within the file name which correspond to the data category;
mapping the identified subset of characters within the file name to a category value from among the plurality of category values based on the mapping key;
displaying an identifier of the electronic computer file via a software application; and
dynamically populating a predefined field within the software application corresponding to the data category with the mapped category value.

* * * * *